United States Patent
Menezes et al.

(10) Patent No.: US 10,484,273 B2
(45) Date of Patent: Nov. 19, 2019

(54) NOTIFICATION FOR A PRIORITIZED MEDIA PATH FOR A COMMUNICATION SESSION

(71) Applicant: Microsoft Technology Licensing, LLC, Redmond, WA (US)

(72) Inventors: Pascal Francis Menezes, Bellevue, WA (US); Gunter Leeb, Redmond, WA (US); Amer Aref Hassan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 553 days.

(21) Appl. No.: 14/818,702

(22) Filed: Aug. 5, 2015

(65) Prior Publication Data
US 2017/0041221 A1    Feb. 9, 2017

(51) Int. Cl.
| | | |
|---|---|---|
| G06F 15/173 | (2006.01) | |
| H04L 12/721 | (2013.01) | |
| H04L 29/06 | (2006.01) | |
| H04L 29/08 | (2006.01) | |
| H04W 12/08 | (2009.01) | |
| H04L 12/801 | (2013.01) | |
| H04L 12/851 | (2013.01) | |

(52) U.S. Cl.
CPC ........ *H04L 45/38* (2013.01); *H04L 29/08621* (2013.01); *H04L 47/11* (2013.01); *H04L 47/2408* (2013.01); *H04L 47/2433* (2013.01); *H04L 63/10* (2013.01); *H04L 65/1016* (2013.01); *H04L 65/1069* (2013.01); *H04L 65/1083* (2013.01); *H04L 65/80* (2013.01); *H04L 67/146* (2013.01); *H04W 12/08* (2013.01); *H04L 63/08* (2013.01)

(58) Field of Classification Search
CPC ...................................................... H04L 45/38
USPC ............................................................ 709/238
See application file for complete search history.

(56) References Cited

U.S. PATENT DOCUMENTS

| | | |
|---|---|---|
| 6,493,317 B1 | 12/2002 | Ma |
| 8,144,591 B2 | 3/2012 | Ghai et al. |
| 8,578,018 B2 | 11/2013 | Zavalkovsky et al. |
| 8,601,058 B2 | 12/2013 | Ahmad et al. |
| 8,811,281 B2 | 8/2014 | Leung et al. |
| 2004/0158646 A1* | 8/2004 | Miernik ............... H04L 47/10 709/249 |

(Continued)

FOREIGN PATENT DOCUMENTS

CN    102377749    3/2012

OTHER PUBLICATIONS

"International Search Report and Written Opinion", Application No. PCT/US2016/044135, dated Oct. 28, 2016, 13 pages.

(Continued)

*Primary Examiner* — Hamza N Algibhah
*Assistant Examiner* — Hannah S Wang
(74) *Attorney, Agent, or Firm* — Schwegman Lundberg & Woessner, P.A.

(57) ABSTRACT

Techniques for notification for a prioritized media path for a communication session are described. According to various embodiments, a communication session is authenticated with a communication service. The communication service interacts with an Internet Protocol (IP) network and a wireless access network to cause the communication session to be routed across a prioritized media path.

20 Claims, 6 Drawing Sheets

(56) References Cited

U.S. PATENT DOCUMENTS

| | | | | |
|---|---|---|---|---|
| 2004/0258003 | A1* | 12/2004 | Kokot | H04L 12/185 370/254 |
| 2005/0207411 | A1* | 9/2005 | Ota | H04L 12/2856 370/389 |
| 2007/0206763 | A1 | 9/2007 | Chandra et al. | |
| 2008/0304485 | A1* | 12/2008 | Sinha | H04L 12/66 370/392 |
| 2010/0124196 | A1* | 5/2010 | Bonar | H04B 7/0689 370/329 |
| 2011/0090902 | A1 | 4/2011 | Jung | |
| 2012/0170547 | A1 | 7/2012 | Oprescu-Surcobe et al. | |
| 2013/0051326 | A1* | 2/2013 | Jeyatharan | H04L 47/245 370/328 |
| 2013/0132854 | A1* | 5/2013 | Raleigh | G06F 3/0482 715/738 |
| 2013/0163523 | A1* | 6/2013 | Hughes | H04W 72/10 370/329 |
| 2013/0232267 | A1 | 9/2013 | Shatzkamer et al. | |
| 2013/0242903 | A1 | 9/2013 | Narkar et al. | |
| 2014/0036673 | A1* | 2/2014 | Ehara | H04L 45/302 370/230.1 |
| 2014/0071813 | A1* | 3/2014 | Cheung | H04L 49/65 370/228 |
| 2014/0136718 | A1 | 5/2014 | Menezes et al. | |
| 2014/0205295 | A1* | 7/2014 | Lamb | H04L 47/2491 398/66 |
| 2015/0117198 | A1 | 4/2015 | Menezes et al. | |
| 2018/0132171 | A1* | 5/2018 | Mendahawi | H04W 76/10 |
| 2018/0288776 | A1* | 10/2018 | Bostick | H04W 24/08 |

OTHER PUBLICATIONS

"Bandwidth Security and QoS Considerations", Cisco Unified Contact Center Express Solution Reference Network Design Release 9.0(1), Aug. 27, 2008, 20 pages.

"Cisco Unified Communications Manager (CallManager)", Retrieved From: <http://www.cisco.com/c/en/us/products/unified-communications/unified-communications-manager-callmanager/index.html> Jun. 17, 2015, Jun. 8, 2014, 3 pages.

"Embracing a New Era of Mobile Broadband", Alcatel—Lucent, IP Mobile Core, Technology White Paper, Mar. 10, 2014, 18 pages.

"Enterprise Medianet Quality of Service Design 4.0—Overview", Retrieved from <https://web.archive.org/web/20140315025123/http://www.cisco.com/c/en/us/td/docs/solutions/Enterprise/WAN_and_MAN/QoS_SRND_40/QoSIntro_40.html> on Jun. 23, 2015, Mar. 15, 2014, 28 pages.

"Unified Capabilities Framework 2013 (UC Framework 2013)", In Proceedings: The Office of the DoD Chief Information Officer, Jan. 2013 Available at: <http://www.disa.mil/Network-Services/UCCO/~/media/Files/DISA/Services/UCCO/UCR2013/UC_Framework_2013_Combined.pdf>, Jan. 2013, 414 pages.

Abouzeid, "Quality of Experience-Enabled Social Networks", In Proceedings of 10th ACM Symposium on QoS and Security for Wireless and Mobile Networks, Sep. 21, 2014, 8 pages.

"International Preliminary Report on Patentability Issued in PCT Application No. PCT/US2016/044135", dated Jul. 10, 2017, 8 Pages.

* cited by examiner

NOTIFICATION FOR A PRIORITIZED MEDIA PATH FOR A COMMUNICATION SESSION

BACKGROUND

Modern communication systems have an array of capabilities, including integration of various communication modalities with different services. For example, systems that enable users to share and collaborate in creating and modifying various types of documents and content may be integrated with multimodal communication systems providing different kinds of communication and collaboration capabilities. Such integrated systems are sometimes referred to as Unified Communication (UC) systems.

While UC systems provide for increased flexibility in communications, they also present a number of implementation challenges. For instance, UC data flows are typically routed over networks that are unaware of attributes of the individual flows. Thus, challenges arise in selecting an optimum routing path for a UC data flow, and in responding to changes in signal quality across a data path for a UC data flow.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for notification for a prioritized media path for a communication session are described. According to various embodiments, a communication session is authenticated with a communication service. The communication service interacts with an Internet Protocol (IP) network and a wireless access network to cause the communication session to be routed across a prioritized media path.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
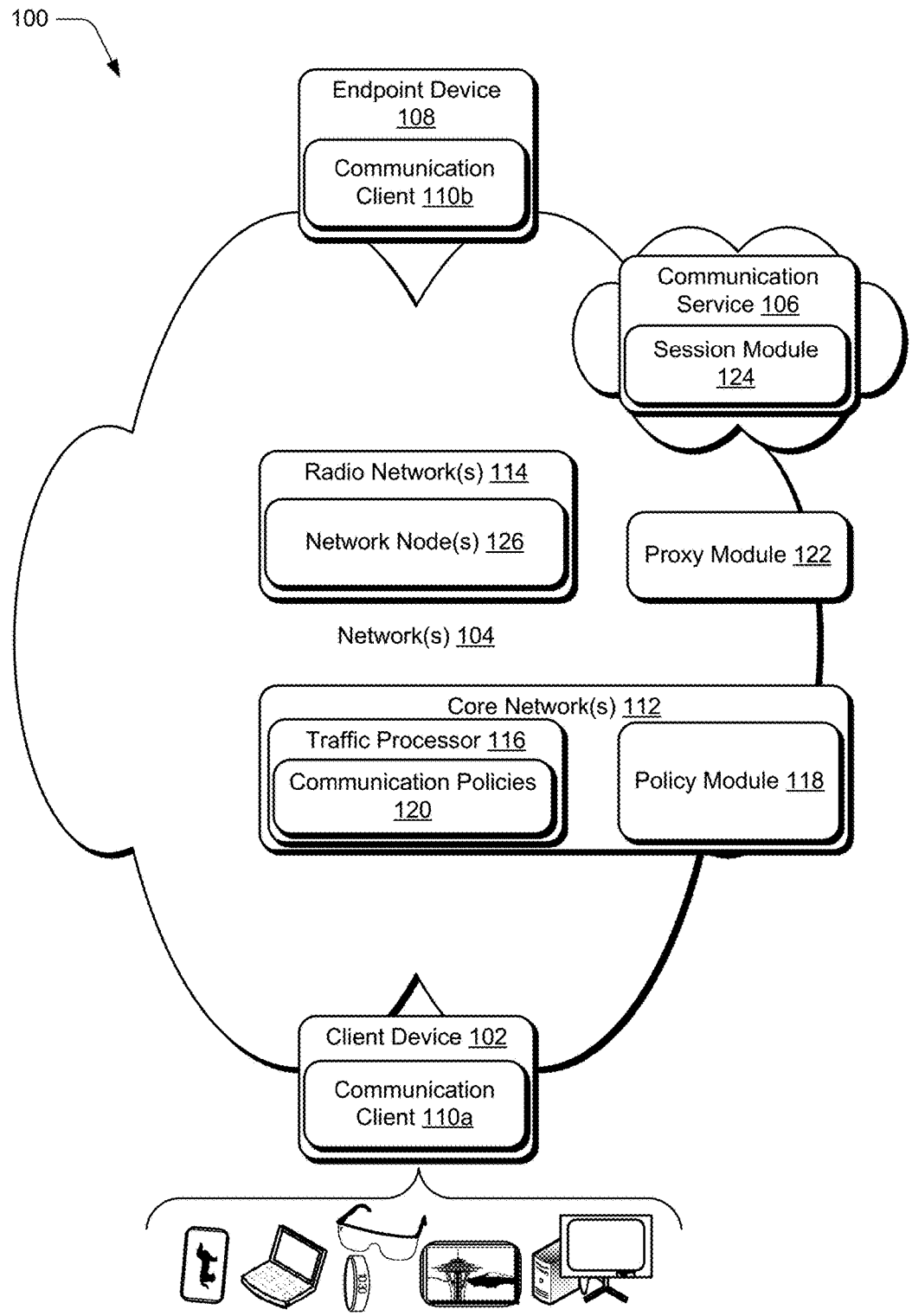
FIG. 1 is an illustration of an environment in an example implementation that is operable to employ techniques discussed herein.

Techniques for notification for a prioritized media path for a communication session are described. A communication session, for instance, represents an exchange of communication media between different nodes in a network. Examples of a communication session include a Voice over Internet Protocol (VoIP) call, a video call, text messaging, a file transfer, and/or combinations thereof. In at least some embodiments, a communication session represents a Unified Communication (UC) session.

According to various implementations, a communication session between a client device and an endpoint device is initiated via a communication service, such as a web-based UC service. A media flow of the communication session is routed from the client device across an Internet Protocol (IP) network to a radio access network, where it is wirelessly transmitted to the endpoint device. In at least some implementations, the IP network represents an IP packet core network such as an Evolved Packet Core (EPC) network, and the radio access network represents a high-speed wireless network, such as a Universal Terrestrial Radio Access Network (UTRAN) network. The IP network and the UTRAN network, for instance, represent components of a mobile broadband network, such as a Long-Term Evolution (LTE) network.

Continuing with the example scenario, the communication service ascertains that the communication session represents an authenticated media flow that is entitled to receive a prioritized service level. A user involved in the communication session, for instance, has a user account with the communication service that entitles the user to a prioritized service level for the communication session. Accordingly, the communication service interacts with the IP network and the radio network to cause the communication session to be moved to a prioritized media path. In at least some implementations, the communication service interacts with the IP network and the radio network via a network proxy that acts as an intermediary for the communication service.

Based on this interaction, the IP network marks a media flow of the communication session with a prioritized service marking. For instance, data packets of the communication session are marked with a prioritized quality of service (QoS) marking. Accordingly, the IP network moves the communication session to a prioritized routing path across the IP network. Further based on the interaction by the communication service, the radio network moves the communication session to a prioritized wireless channel. The radio network, for instance, moves the communication session from a standard bearer channel to a dedicated bearer channel that provides the communication session with a higher airtime prioritization than does the standard bearer channel.

Thus, techniques described herein provide communication sessions that are authenticated with a communication service with prioritized service over other, non-authenticated media flows. This not only provides prioritized service to authenticated users, but protects network resources from interference and malicious activities that may result from allowing non-authenticated media flows to access the network resources.

In the following discussion, an example environment is first described that is operable to employ techniques described herein. Next, a section entitled "Propagating Attributes of Communication Sessions" discusses some example ways for notifying different communication components of attributes of communication sessions. Following this, a section entitled "Example Implementation Scenarios" describes some example implementation scenarios in accordance with one or more embodiments. Next, a section entitled "Example Procedures" describes some example procedures in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

FIG. 1 is an illustration of an environment 100 in an example implementation that is operable to employ techniques for notification for a prioritized media path for a communication session described herein. Generally, the environment 100 includes various devices, services, and networks that enable communication via a variety of different modalities. For instance, the environment 100 includes a client device 102 connected to one or more networks 104. The client device 102 may be configured in a variety of ways, such as a traditional computer (e.g., a desktop personal computer, laptop computer, and so on), a mobile station, an entertainment appliance, a smartphone, a netbook, a game console, a handheld device (e.g., a tablet), a wearable device, and so forth.

The network 104 is representative of any suitable network and/or combination of networks that provides the client device 102 with connectivity to various devices and services. The network 104 may provide the client device 102 with connectivity via a variety of different wired and/or wireless connectivity technologies, such as broadband cable, digital subscriber line (DSL), wireless data connectivity (e.g., WiFi™), wireless cellular, T-carrier (e.g., T1), Ethernet, and so forth.

The environment 100 further includes a communication service 106, which is representative of a service to perform various tasks for management of communication between the client device 102 and an endpoint device 108. Generally, the endpoint device 108 is representative of any device with which the client device 102 may exchange data, such as an end-user device connected to the network 104. The communication service 106, for instance, can manage initiation, moderation, and termination of communication sessions. Examples of the communication service 106 include a VoIP service, an online conferencing service, a UC service, and so forth. In at least some embodiments, the communication service 106 may be implemented as or be connected to a private branch exchange (PBX) in communication with a Public Switched Telephone Network ("PSTN") to enable voice communication between the client device 102 and the endpoint device 108.

In at least some embodiments, the client device 102 is configured to interface with the communication service 106 via a communication client 110a to enable communication between the client device 102 and the endpoint device 108. The communication client 110a is representative of functionality (e.g., an application and/or service) to enable different forms of communication via the client device 102. Examples of the communication client 110a include a voice communication client (e.g., a VoIP client), a video communication client, a messaging application, a content sharing application, and combinations thereof. The communication client 110a, for instance, enables different communication modalities to be combined to provide diverse communication scenarios.

According to one or more implementations, the communication client 110a represents an application that is installed on the client device 102. Additionally or alternatively, the communication client 110a can be implemented as a remote application, such as accessed via a web browser, a web application, and so forth.

The endpoint device 108 includes a communication client 110b, which represents an instance of the communication client 110a that can be leveraged by the endpoint device 108 to communicate with other devices. For instance, a communication session between the client device 102 and the endpoint device 108 represents an exchange of communication media between the communication client 110a and the communication client 110b.

The network 104 further includes various component networks that enable routing of data (e.g., communication session data) between the client device 102 and the endpoint device 108. For instance, the network 104 includes one or more core networks 112 and one or more radio networks 114. The core network 112 is representative of functionality for converting packet-based data into a form that can be transmitted by the radio network 114 to various devices, such as the endpoint device 108. In at least some implementations, the core network 112 represents an Evolved Packet Core (EPC) network. The radio network 114 is representative of one or more radio access networks for wireless transmission of data to various devices and entities, such as to the endpoint device 108 and the client device 102. In at least some implementations, the radio network 114 represents an evolved UTRAN (e-UTRAN). The core network 112 and the radio network 114, for instance, are implemented by an enterprise wireless carrier, such as a wireless cellular network carrier.

The core network 112 includes various functionalities for processing of communication session data, such as a traffic processor 116 and a policy module 118. The traffic processor 116 is representative of functionality for ascertaining attributes of media flows of communication sessions and for applying communication policies 120 to the media flows. Generally, the communication policies 120 specify various parameters and actions to be applied to media flows. For instance, the communication policies 120 specify quality of service (QoS) markings to be applied to media flows. The communication policies 120, for example, specify QoS in terms of Differentiated Services Code Point (DSCP) markings that are to be applied to particular media flows.

In at least some implementations, the communication policies 120 are session-specific, e.g., are defined with respect to discrete media flows. For instance, a particular communication policy 120 can be applied by the traffic processor 116 based on an identifier for a media flow, such as based on devices and/or users involved in the media flow.

The policy module 118 is representative of functionality for interfacing with the traffic processor 116 and for configuring the communication policies 120. As further detailed below, the communication service 106 can communication attributes of a communication session to a proxy module 122, which translates the attributes into a form that is understood by the policy module 118. The proxy module 122 communicates the translated attributes to the policy module 118, which uses the translated attributes to configure a communication policy 120 for the communication session. The traffic processor 116 applies the communication policy 120 to a media flow of the communication session.

Generally, the proxy module 122 is representative of functionality to receive attributes of a communication session from the communication service 106, and to translate the attributes into different forms. For instance, the communication service 106 includes a session module 124 that is configured at ascertain attributes of a communication session, and to propagate attributes of the communication session to various entities. For instance, the session module 124 communicates attributes of a communication session to the proxy module 122 according to a protocol utilized by the communication service 106. The proxy module 122 translates the attributes into a different protocol utilized by the core network 112. The proxy module 122 then communicates the translated attributes to the policy module 118 for use in configuring a communication policy 120.

Further to the environment 100, the radio network 114 includes various infrastructure components for enabling transmission of wireless signal, including network nodes 126. Generally, the network nodes 126 represent hardware and logic for transmitting wireless signal to various devices, such as the endpoint device 108 and the client device 102. In at least some implementations, the network nodes 126 represent Evolved Node B (eNodeB) elements of the radio network 114.

While the environment 100 is discussed with reference to particular examples of devices and functionalities, it is to be appreciated that techniques for notification for a prioritized media path for a communication session described herein can be employed with a variety of different devices and in a variety of different network architectures in accordance with the claimed embodiments.

Having described an example environment in which the techniques described herein may operate, consider now a discussion of example ways of propagating various attributes of communication sessions in communication systems in accordance with one or more embodiments.

Propagating Attributes of Communication Sessions

According to various embodiments, techniques can be employed to dynamically enlighten various network components with information about communication sessions. For instance, notification events can be generated that include various attributes of communication sessions. The notification events can be propagated to different entities further to techniques for notification for a prioritized media path for a communication session discussed herein.

In at least some embodiments, notification events can be configured using a communication application programming interface (API) that can be leveraged to configure and communicate session information to various network components involved in a communication session. For example, the communication API can identify dialogue events and session events for which attributes of a communication session can be identified. Consider, for instance, the following events and attributes that may be conveyed via a notification event generated by the communication API:

Dialogue Events—

These events apply to various portions of a communication session, such as the start, update, and end of a communication session. A dialogue event can include one or more of the following example attributes.

(1) Timestamp: This attribute can be leveraged to specify timestamps for a start of a communication session, updates that occur during a communication session, and an end (e.g., termination) of a communication session.

(2) Source IP Address: This attribute can be leveraged to specify an IP address for a device that is a source of media during a communication session, e.g., a device that initiates a communication session.

(3) Destination IP Address: This attribute can be leveraged to specify an IP address for a device that is to receive media as part of a communication session.

(4) Transport Type: This attribute can be leveraged to specify a transport type or combination of transport types for a communication session. Examples of transport types include Transmission Control Protocol (TCP), User Datagram Protocol (UDP), and so forth.

(5) Source Port: this attribute can be leveraged to specify an identifier for a port at a source device, e.g., a source device identified by the Source IP Address referenced above.

(6) Destination Port: This attribute can be leveraged to specify an identifier for a port at a destination device, e.g., a destination device identified by the Destination IP Address referenced above.

(7) Media Type: This attribute can be leveraged to specify a media type and/or types that are to be transmitted and/or are being transmitted as part of a communication session. As discussed elsewhere herein, the communication session can involve multiple different types of media. Thus, the Media Type attribute can be employed to identify media types in a communication session, such as for applying the communication policies discussed herein.

(8) Bandwidth Estimation: This attribute can be leveraged to specify an estimated bandwidth that is to be allocated for a communication session. The estimated bandwidth, for instance, can be based on various factors, such as a privilege level associated with a user, type and/or types of media included in a communication session, and so forth.

(9) To: This attribute can be leveraged to identify a user to which media in a communication session is to be transmitted.

(10) From: This attribute can be leveraged to identify a user from which media and a communication session is transmitted.

(11) Error Code: This attribute can be leveraged to specify various error codes for pairs that may occur as part of a communication session. For example, errors can include errors that occur during initiation the communication session, errors that occurred during a communication session, errors that occur when a communication session is terminated, and so forth.

(12) Class of Service: This attribute can be leveraged to specify a class of service (CoS) to be applied to a communication session. Class of service may be specified in various ways, such as QoS markings, DSCP markings, and so forth. Examples of class of service include best-effort traffic (BE), Expedited Forwarding (EF) Assured Forwarding (AF), and so on.

Session Problem Events—

These events can be generated and applied when a communication session experiences errors, performance degradation, and so forth. A session problem event may include one or more of the attributes discussed above with reference to Dialogue Events, and may also include one or more of the following attributes.

(1) Mean Opinion Score (MOS) Degradation: This attribute can be leveraged to specify a MOS for a communication session. The attribute, for instance, can be used to indicate that an overall quality of a communication session has decreased.

(2) Jitter Inter-Arrival Time: This attribute can be leveraged to specify jitter values for a communication session. The attribute, for instance, can be used to indicate that a jitter value or values have increased, e.g., have exceeded a specified jitter value threshold.

(3) Packet Loss Rate: This attribute can be leveraged to specify a packet loss rate for a communication session. The attribute, for instance, can be used to indicate that a packet loss rate has increased, e.g., has exceeded a specified packet loss rate value threshold.

(4) Round Trip Delay (RTD): This attribute can be leveraged to specify RTD values for packets in communication sessions. The attribute, for instance, can be used to indicate that RTD values for packets have increased, e.g., have exceeded a specified RTD value threshold.

(5) Concealment Ratio: This attribute can be leveraged to specify a cumulative ratio of concealment time over speech time observed after starting a communication session. The attribute, for instance, can be used to specify that a concealment ratio has increased, e.g., has exceeded a specified concealment ratio value threshold.

Thus, various notifications discussed herein can include one or more of the attributes discussed above and can be used to propagate the attributes to various entities.

Having described an example ways of propagating attributes of communication sessions, consider now some example implementation scenarios for notification for a prioritized media path for a communication session in accordance with one or more embodiments.

Example Implementation Scenarios

The following section describes example implementation scenarios for notification for a prioritized media path for a communication session in accordance with one or more embodiments. The implementation scenarios may be implemented in the environment 100 discussed above, and/or any other suitable environment.

Figure 2:
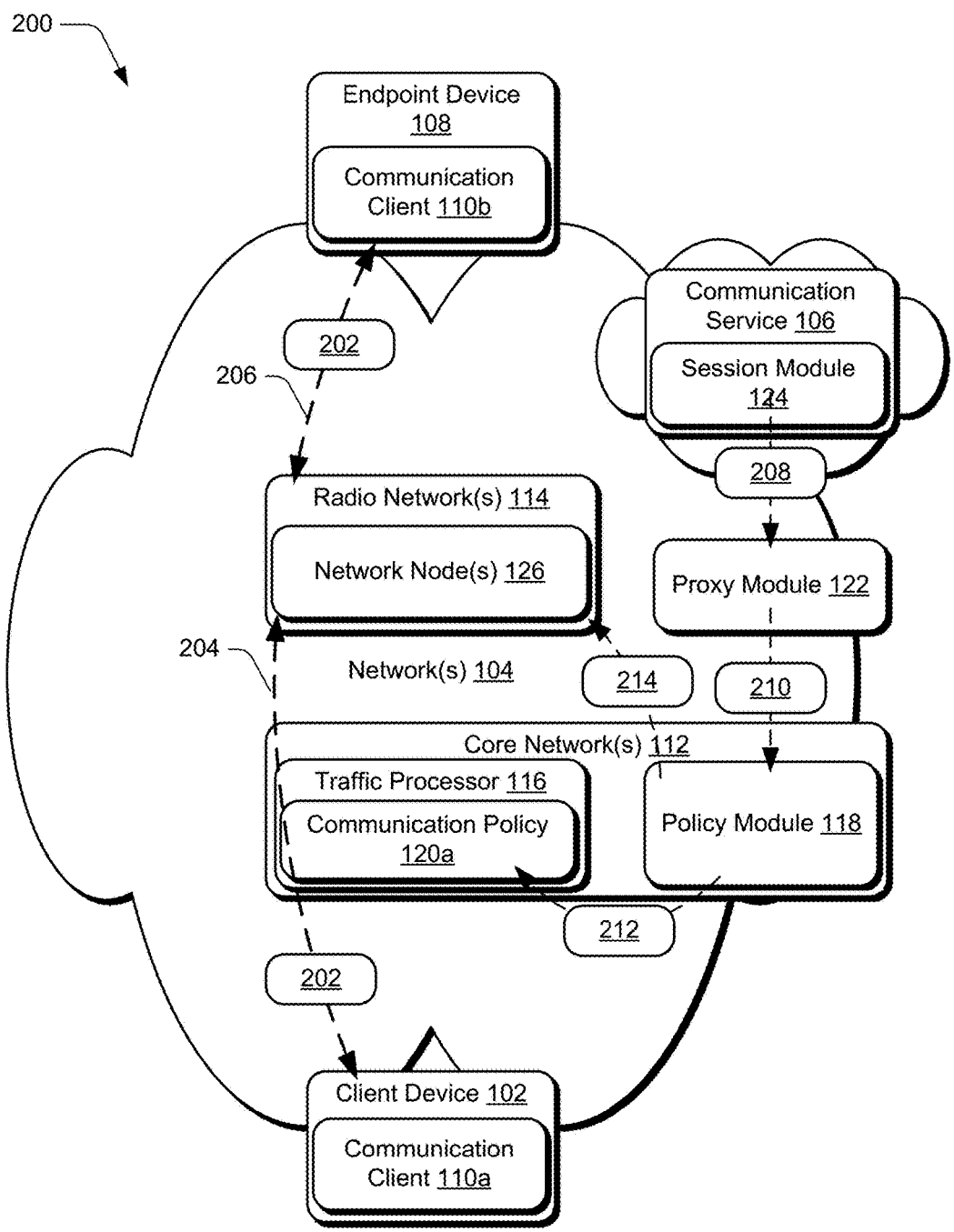
FIG. 2 illustrates an example implementation scenario for propagating instructions for handling a communication session in accordance with one or more embodiments.

FIG. 2 illustrates an example implementation scenario 200 for propagating instructions for handling a communication session in accordance with one or more implementations. The scenario 200 includes various entities and components introduced above with reference to the environment 100.

In the scenario 200, the communication client 110a of the client device 102 initiates a communication session 202 with the communication client 110b of the endpoint device 108. For instance, a user of the client device 102 interacts with the communication client 110a to initiate the communication session 202, such as by dialing a telephone number, selecting a contact, selecting a hyperlink, and so forth. Accordingly, the communication session 202 is established, which represents a flow of communication media from the client device 102 to the endpoint device 108, a vice-versa. The communication session 202 may include various types of communication media, such as voice, video, messaging, content, and so forth.

According to various implementations, the client device 102 communicates data of the communication session 202 in a packetized form to the core network 112. The core network 112 processes the data packets into a form that can be utilized by the radio network 114, and communicates the processed packets to the radio network 114. The radio network 114 converts the processed packets into wireless signal which is transmitted for receipt by the endpoint device 108 as part of the communication session 202.

Further to the scenario 200, the communication session 202 is initially routed across the core network 112 utilizing a standard (e.g., default) routing path ("standard path") 204. The standard path 204, for instance, represents a default path that is utilized for routing general media flows across the core network 112. In at least some implementations, the standard path 204 is utilized for routing media flows according to a best effort CoS.

Further, the communication session 202 is initially transmitted by the radio network 114 to the endpoint device 108 utilizing a default bearer ("default") channel 206. The default channel 206, for instance, represents a general wireless channel and/or collection of wireless channels that is used for wireless data communication.

In response to initiation of the communication session 202, the communication service 106 communicates an initiation notification 208 to the proxy module 122. The communication session 202, for instance, is initiated and/or managed via the communication service 106, and thus the communication service 106 has awareness of various attributes of the communication session 202. In at least some implementations, the notification 208 is generated using the communication API discussed above. Attributes of the communication API, for instance, are populated at least in part with values that identify various attributes of the communication session, which are then utilized to generate the notification 208. Example attributes indicated by the notification 208 includes identifiers for users and/or devices involved in the communication session (e.g., the client device 102 and the endpoint device 108), media type(s) included, service level (e.g., "prioritized," "standard," and so forth), and so on.

The proxy module 122 receives the notification 208 and translates the attributes included in the notification 208 into a protocol utilized by the core network 112. The proxy module 122 generates a session notification 210, populates the session notification 210 with the translated attributes, and communicates the notification 210 to the policy module 118. The policy module 118 processes the notification 210 to identify the translated attributes of the communication session 202, and utilizes the translated attributes to engage in a configuration event 212 with the traffic processor 116. Generally, the configuration event 212 involves propagating at least some of the translated attributes from the session notification 210 to the traffic processor 116, which causes a communication policy 120a to be generated. The policy module 118, for instance, programs the traffic processor 116 with the translated attributes to generate the communication policy 120a. The communication policy 120a represents an instance of the communication policies 120 introduced above. While a single communication policy 120a is depicted in the scenario 200, it is to be appreciated that the traffic processor 116 may maintain and enforce multiple different communication policies 120 across multiple different communication sessions.

According to various implementations, the communication policy 120a is generated specifically for the communication session 202 and specifies actions and/or behaviors to be performed in relation to the communication session 202. For instance, the communication policy 120a includes identification information that enables the traffic processor 116 to differentiate the media flow of the communication session 202 from other media flows. Further, the communication policy 120a specifies that the media flow (e.g., data packets) of the communication session is to be marked with a prioritized QoS marking, such as Assured Forwarding. As further detailed below, the traffic processor 116 applies the communication policy 120a to give priority treatment to the communication session 202.

Continuing with the scenario 200, the policy module 118 initiates a configuration event 214 with the radio network 114. Generally, the configuration event 214 includes identification information that identifies the communication session 202 and enables the radio network 114 to differentiate a media flow of the communication session 202 from other media flows. Further, the configuration event 214 instructs the radio network 114 to move the communication session to a prioritized channel. As further detailed below, the radio network 114 moves the communication session 202 to a prioritized channel in response to the configuration event 214.

Figure 3:
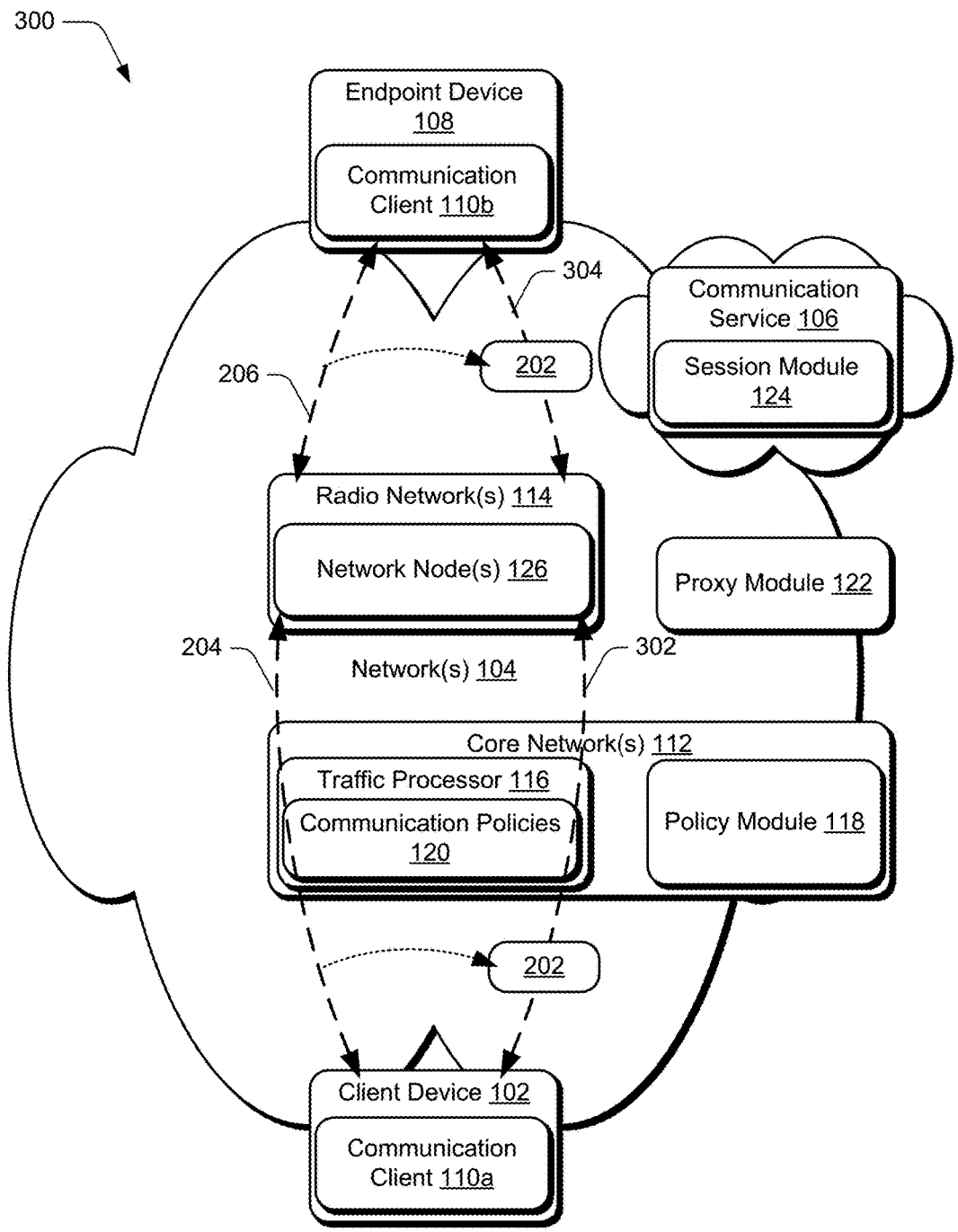
FIG. 3 illustrates an example implementation scenario for prioritizing a communication session in accordance with one or more embodiments.

FIG. 3 illustrates an example implementation scenario 300 for prioritizing a communication session in accordance with one or more implementations. The scenario 300, for instance, represents a continuation of the scenario 200 and includes various entities and components introduced above with reference to the environment 100.

In the scenario 300, the traffic processor 116 applies the communication policy 120a to the communication session 202. For instance, the traffic processor 116 marks data of the communication session 202 with a prioritized QoS marking, such as Assured Forwarding. In at least some implementations, the communication session 202 is initially marked with a default QoS when it is initiated, such as Best Effort. Accordingly, the traffic processor 116 applies the communication policy 120a to remark the communication session 202 from a default QoS (e.g., lower QoS) to a prioritized QoS.

In response to remarking the communication session 202 to the prioritized QoS, the communication session 202 is rerouted from the standard path 204 to a prioritized routing path ("prioritized path") 302 across the core network 112. Generally, the prioritized path 302 represents a secure routing path across the core network 112 that provides enhanced service over the standard path 204, such as faster signal traversal, higher signal quality, and/or greater data security across the core network 112.

According to various implementations, the traffic processor 116 enforces a security policy that indicates that only authenticated trusted media flows are permitted to traverse the core network 112 and be passed on to the radio network 114. Enforcing such a security policy assists in protecting the core network 112 and the radio network 114 from malicious activities, such as malware, Denial-of-Service (DoS) attacks, and so forth, that may be introduced in an untrusted and/or unauthenticated media flow. Accordingly, when the communication session 202 is first initiated, the communication session 202 is routed across the standard channel 204. Generally, the standard channel 204 represents a channel that is used for temporarily routing unauthenticated media flows across the core network 112. For instance, the standard channel 204 is isolated from primary infrastructure components of the core network 112. Further, media flows across the standard channel 204 may be monitored for attributes and/or behaviors that are indicative of malicious activities. Configuration of the communication policy 120a, however, indicates that the communication session 202 is an authenticated and trusted media flow. Thus, the communication session 202 is marked with a prioritized QoS and is rerouted to the prioritized path 302. The prioritized path 302, for instance, is reserved for trusted and/or authenticated media flows, and provides such media flows with enhanced service over the standard path 204.

Continuing with the scenario 300, and in response to the configuration event 214 discussed above, the radio network 114 moves the communication event 202 from the default channel 206 to a dedicated bearer channel ("dedicated channel") 304. Generally, the dedicated channel 304 represents a channel and/or set of channels that are configured to provide enhanced wireless service as compared to the default channel 206. For instance, the dedicated channel 304 provides the communication session 202 with a higher airtime prioritization than does the default channel 206. Thus, the scenario 300 illustrates that based on interaction by the communication service 106 with components of the core network 112 and the radio network 114, the communication session 202 is moved from a default media path (e.g., the standard path 204 and the default channel 206) to a prioritized media path, e.g., the prioritized path 302 and the prioritized channel 304.

Accordingly, the scenarios 200, 300 illustrate that techniques for notification for a prioritized media path for a communication session discussed herein enable media flows authenticated with the communication service 106 to be provided with increased service levels across different networks involved in routing the media flows. This not only enables increased quality of service for media flows, but protects networks and services from malicious activities that may result from unauthenticated media flows.

In at least some implementations, when the communication session 202 is terminated, the communication session is moved back to the standard path 204 and the default channel 206 during the termination process. Further, the communication policy 120a may be cancelled (e.g., deleted) such that a subsequent unauthenticated media flow cannot attempt to spoof the communication session 202 and thus be routed through prioritized paths and/or channels across the different networks.

According to various implementations, the rerouting described above is implemented without disconnecting and/or interrupting the communication session 202, independent of user input, and/or independent of a user being notified. Thus, seamless rerouting can be effected with little or no negative impact on a user experience during a communication session. Further, the scenarios 200, 300 may be performed on a per-session basis to generate communication policies that are specific the discrete instances of communication sessions.

According to various implementations, the different notifications and events discussed in the implementation scenarios can be communicated separately and independently ("out-of-band") from a media flow of the communication session 202.

The example implementation scenarios presented above are discussed with reference to discrete devices and discrete sets of media paths for purpose of example only. It is to be appreciated, however, that embodiments may be employed in a variety of different networks and with multiple different devices not expressly discussed herein. Further, connection scenarios are often dynamically changing, and thus techniques discussed herein may be applied dynamically to map and remap media paths to account for changes in connection attributes.

Having discussed some example implementation scenarios, consider now a discussion of some example procedures in accordance with one or more embodiments.

Example Procedures

The following discussion describes some example procedures for notification for a prioritized media path for a communication session in accordance with one or more embodiments. The example procedures may be employed in the environment 100 of FIG. 1, the system 600 of FIG. 6, and/or any other suitable environment. In at least some implementations, the steps described for the various procedures can be implemented automatically and independent of user interaction. The procedures, for instance, represent example ways of performing various aspects of the implementation scenarios described above.

Figure 4:
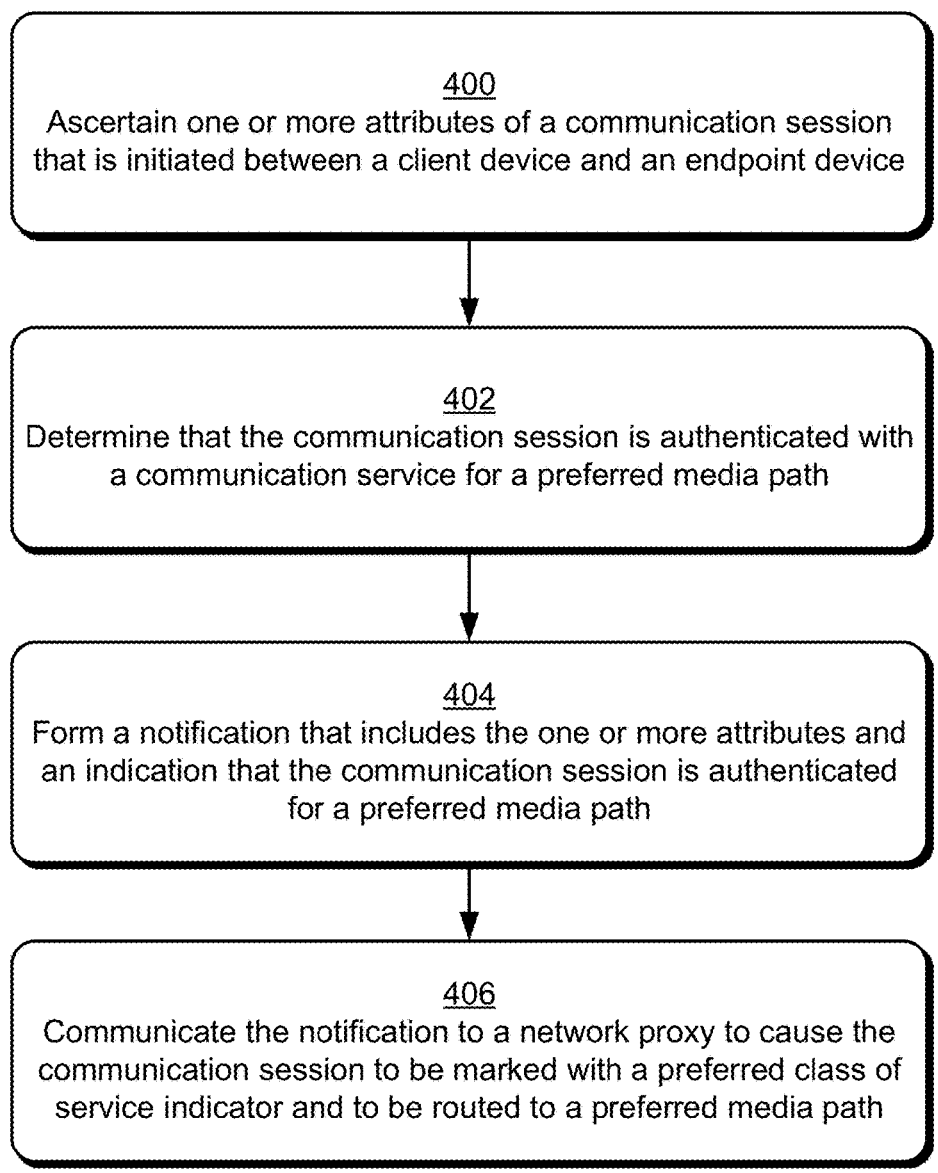
FIG. 4 is a flow diagram that describes steps in a method for causing a communication session to be routed to a prioritized media path in accordance with one or more embodiments.

FIG. 4 is a flow diagram that describes steps in a method in accordance with one or more embodiments. The method describes an example procedure for causing a communication session to be routed to a prioritized media path in accordance with one or more embodiments.

Step 400 ascertains one or more attributes of a communication session that is initiated between a client device and an endpoint device. The session module 124 of the communication service 106, ascertains attributes of the communication session 202. Examples of different session attributes are discussed above, such as with reference to the communication API. In at least some implementations, the one or more attributes are received by a communication component of the communication service 106.

Step 402 determines that the communication session is authenticated with a communication service for a prioritized media path. For instance, the session module 124 determines that a user that initiates the communication session is authenticated with the communication service 106. The user, for instance, has a valid user profile with the communication service 106 that entitles the user to prioritized service.

Step 404 forms a notification that includes the one or more attributes and an indication that the communication session is authenticated for a prioritized media path. The session module 124, for example, generates a notification that includes attributes of the communication session, and that indicates that the communication session is permitted to be routed to one or more prioritized media paths. In at least some implementations, the notification is formed utilizing the communication API detailed above. For instance, the notification is populated with values for one or more of the attributes described with reference to the communication API. One example of a suitable notification is described above with reference to the initiation notification 208.

Step 406 communicates the notification to a network proxy to cause the communication session to be marked with a prioritized class of service indicator and to be routed to a prioritized media path. The session module 124, for instance, communicates the notification to the proxy module 122. The proxy module 122 translates attributes of the notification into a protocol that is recognized by the core network 112. The proxy module 122 communicates the translated attributes to the policy module 118, which interacts with the traffic processor 116 utilizing the translated attributes to configure a communication policy which indicates that the communication session is to be marked with a prioritized QoS indicator. Accordingly, the communication policy is enforced at the traffic processor 116 such that the communication session is marked at the core network 112 with a prioritized class of service indicator and is routed to a prioritized path across the core network 112. For instance, the communication session 202 is rerouted from the standard path 204 to the prioritized path 302.

The policy module 118 further interacts with a radio access network (e.g., the radio network 114) to cause the communication session to be routed at the radio access network from a standard wireless channel to a prioritized wireless channel for receipt by the endpoint device. The radio access network, for instance, reroutes the communication session 202 from the default channel 206 (e.g., a standard bearer channel) to the prioritized channel 304, e.g., a dedicated bearer channel.

Figure 5:
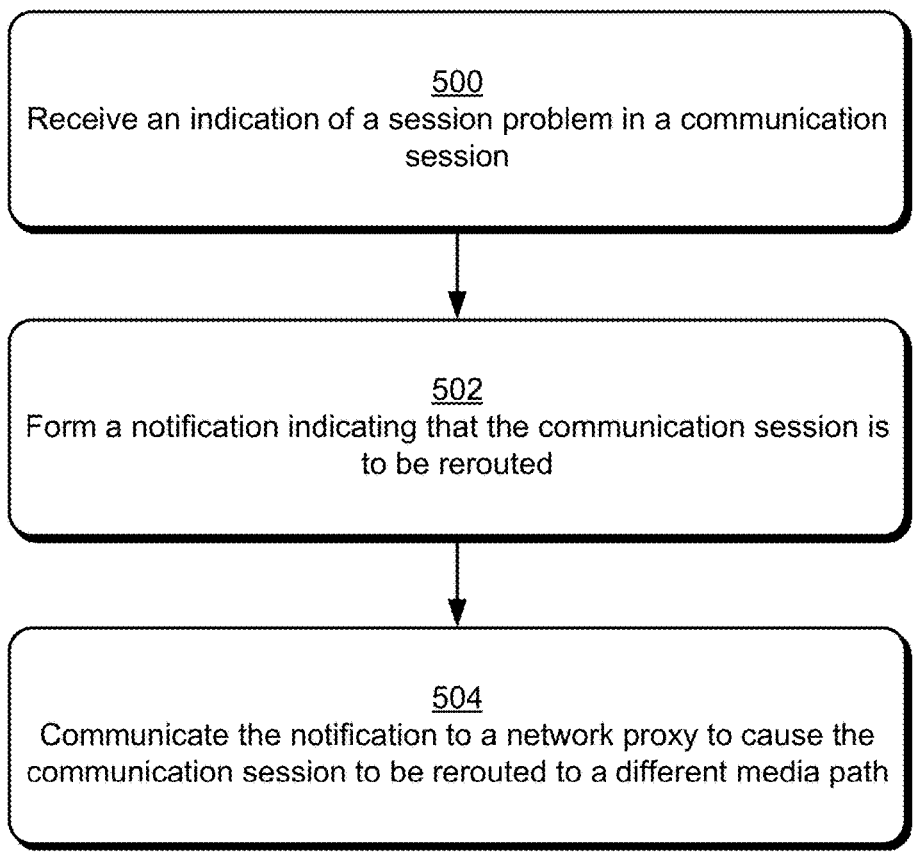
FIG. 5 is a flow diagram that describes steps in a method for causing a communication session to be rerouted in accordance with one or more embodiments.

FIG. 5 is a flow diagram that describes steps in a method in accordance with one or more embodiments. The method describes an example procedure for causing a communication session to be rerouted in accordance with one or more implementations. The procedure, for instance, represents an extension of the procedure described above. For example, the procedure is applied to reroute a communication session that has been previously routed to a prioritized media path according to the procedure and scenarios described above.

Step 500 receives an indication of a session problem in a communication session. The communication service 106, for instance, receives a notification from the client device 102 (e.g., from the communication client 110*a*) that a problem occurs during the communication session 202. For example, the notification indicates one or more of errors that occur in communication session data, a decrease in signal quality, problems with user experience during the communication session, and so forth.

Step 502 forms a notification indicating that the communication session is to be rerouted. For instance, the session module 124 generates a notification that identifies the session problem(s), and that indicates that the communication session is to be rerouted to a different media path. In at least some implementations, the notification is generated using the communication API detailed above, such as using attributes of the described Session Problem Events.

Step 504 communicates the notification to a network proxy to cause the communication session to be rerouted to a different media path. The session module 124, for instance, communicates the notification to the proxy module 122. The proxy module 122 translates attributes of the notification into a protocol that is recognized by the core network 112. The proxy module 122 communicates the translated attributes to the policy module 118, which interacts with the traffic processor 116 utilizing the translated attributes to configure a communication policy which indicates that the communication session is to be rerouted to a different media path. Accordingly, the communication policy is enforced at the traffic processor 116 such that the communication session is rerouted to a different media path. For instance, the communication session 202 is rerouted from the prioritized path 302 to a different prioritized path across the core network 112.

Alternatively or additionally to rerouting at the core network 112, the proxy module 122 may interact with the radio network 114 to cause the communication session to be rerouted to a different bearer channel. For instance, the current dedicated bearer channel being used to route the communication session may be experiencing signal quality problems, such as based on signal interference, excessive traffic, and so forth. Thus, the communication session can be rerouted by the radio network 114 to a different dedicated channel, such as a channel that is known that provide higher signal quality and/or that has less signal traffic. Accordingly, techniques discussed herein can be employed to reroute communication sessions to mitigate session problems.

According to various implementations, the various aspects of the implementations scenarios and procedures described above are performed without handling data of a communication session. For instance, the session module 124 receives attributes of communication sessions and propagates attributes of the communication sessions without receiving and handling media data of the communication sessions. Further, attributes of a communication sessions are propagated separately (e.g., out-of-band) from a media flow of the communication session and in real-time while the communication session is in progress.

Accordingly, techniques described herein enable a media flow of an authenticated communication session to be routed across a prioritized media path and/or set of prioritized media paths. Thus, session quality for the communication session can be increased. Further, networks that maintain prioritized media paths can be protected from unauthenticated media flows that may degrade network performance and/or introduce malicious activities into the networks.

Having discussed some example procedures, consider now a discussion of an example system and device in accordance with one or more embodiments.

Example System and Device

Figure 6:
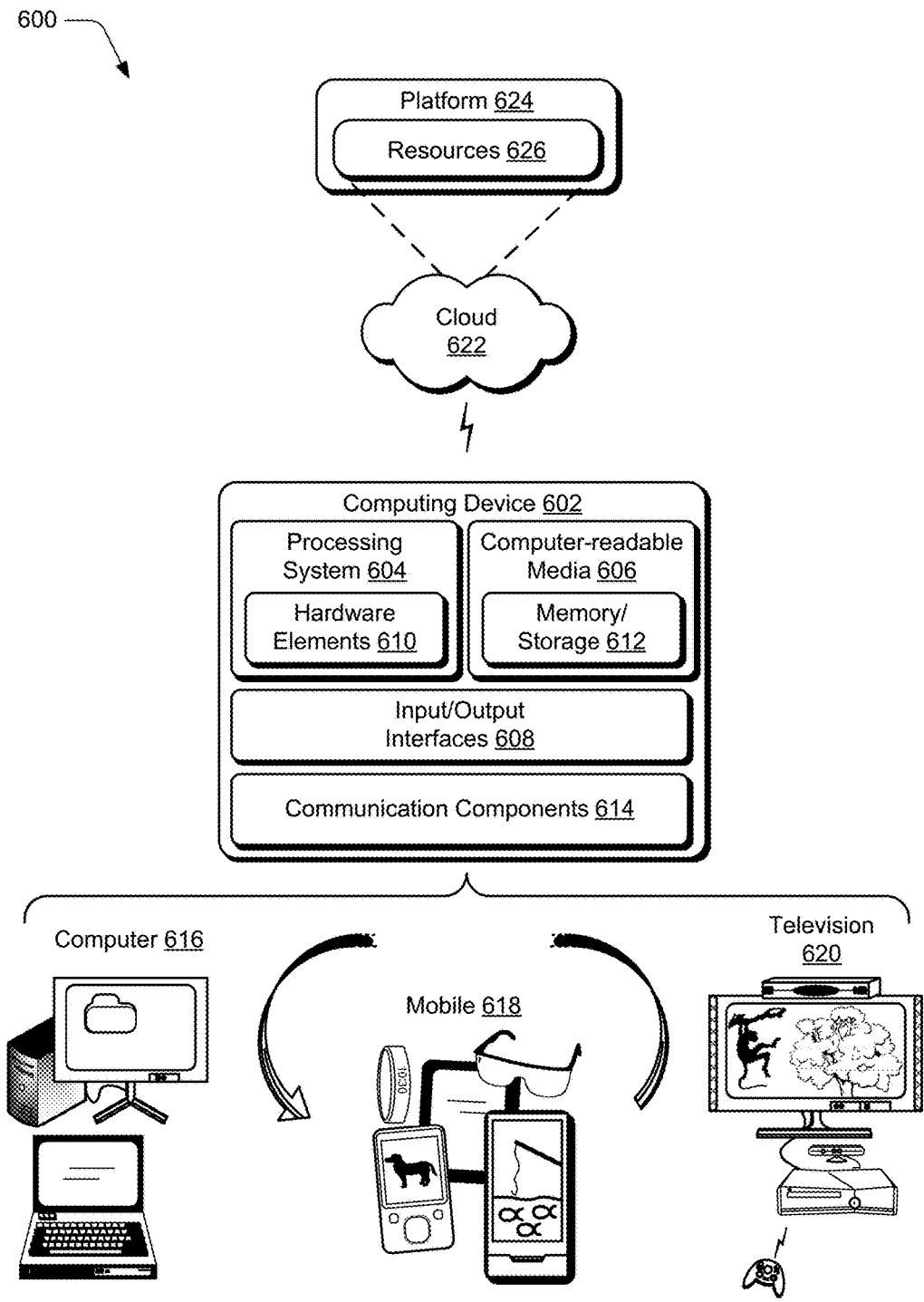
FIG. 6 illustrates an example system and computing device as described with reference to FIG. 1, which are configured to implement embodiments of techniques described herein.

FIG. 6 illustrates an example system generally at 600 that includes an example computing device 602 that is representative of one or more computing systems and/or devices that may implement various techniques described herein. For example, the client device 102, the endpoint device 108, and/or the communication service 106 discussed above with reference to FIG. 1 can be embodied as the computing device 602. The computing device 602 may be, for example, a server of a service provider, a device associated with the client (e.g., a client device), an on-chip system, and/or any other suitable computing device or computing system.

The example computing device 602 as illustrated includes a processing system 604, one or more computer-readable media 606, and one or more Input/Output (I/O) Interfaces 608 that are communicatively coupled one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

The computing device 602 further includes communication components 614, which are representative of functionality to receive and transmit data for the computing device 602. For instance, the communication components 614 represent components for interfacing and communicating with a network, such as via any suitable wired and/or wireless protocol. According to various implementations, the communication components 614 receive data transmitted to the computing device 602 and route the data to one or more other components of the computing device 602. Further, the communication components 614 receive data from one or more internal components of the computing device 602, and cause the data to be communicated to various entities (e.g., devices) remote from the computing device 602.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules that are executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 602 may assume a variety of different configurations, such as for computer 616, mobile 618, and television 620 uses. Each of these configurations includes devices that may have generally different constructs and capabilities, and thus the computing device 602 may be configured according to one or more of the different device classes. For instance, the computing device 602 may be implemented as the computer 616 class of a device that includes a personal computer, desktop computer, a multi-screen computer, laptop computer, netbook, and so on.

The computing device 602 may also be implemented as the mobile 618 class of device that includes mobile devices, such as a mobile phone, portable music player, portable gaming device, a tablet computer, a wearable device, a multi-screen computer, and so on. The computing device 602 may also be implemented as the television 620 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. For example, functionalities discussed with reference to the communication service 106 may be implemented all or in part through use of a distributed system, such as over a "cloud" 622 via a platform 624 as described below.

The cloud 622 includes and/or is representative of a platform 624 for resources 626. The platform 624 abstracts underlying functionality of hardware (e.g., servers) and software resources of the cloud 622. The resources 626 may include applications and/or data that can be utilized while computer processing is executed on servers that are remote from the computing device 602. Resources 626 can also include services provided over the Internet and/or through a subscriber network, such as a cellular or Wi-Fi network.

The platform 624 may abstract resources and functions to connect the computing device 602 with other computing devices. The platform 624 may also serve to abstract scaling of resources to provide a corresponding level of scale to encountered demand for the resources 626 that are implemented via the platform 624. Accordingly, in an interconnected device embodiment, implementation of functionality described herein may be distributed throughout the system 600. For example, the functionality may be implemented in part on the computing device 602 as well as via the platform 624 that abstracts the functionality of the cloud 622.

Discussed herein are a number of methods that may be implemented to perform techniques discussed herein.

Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Implementations discussed herein include:

Example 1

A system for prioritizing a communication session, the system including: at least one processor; and one or more computer-readable storage media including instructions stored thereon that, responsive to execution by the at least one processor, cause the system perform operations including: ascertaining one or more attributes of a communication session that is initiated between a client device and an endpoint device; determining that the communication session is authenticated for a prioritized media path; forming a notification that includes the one or more attributes and an indication that the communication session is authenticated for a prioritized media path; and communicating the notification to a network proxy to cause the communication session to be marked with a prioritized class of service indicator and to be routed from a standard wireless channel to a prioritized wireless channel for receipt by the endpoint device.

Example 2

A system as described in example 1, wherein said determining includes determining that a user of the client device is authenticated for the prioritized media path.

Example 3

A system as described in one or more of examples 1 or 2, wherein the system is configured to perform the operations in real-time while the communication session is in progress.

Example 4

A system as described in one or more of examples 1-3, wherein the system is configured to perform the operations without handling data of the communication session.

Example 5

A system as described in one or more of examples 1-4, wherein said forming includes populating an application programming interface (API) with the one or more attributes, and wherein the notification is formatted at least in part with the API.

Example 6

A system as described in one or more of examples 1-5, wherein said communicating further causes the communication session to be routed from a standard routing path across an Internet Protocol (IP) network to a prioritized routing path across the IP network.

Example 7

A system as described in one or more of examples 1-6, wherein the operations further include: receiving an indication of a session problem in the communication session; and communicating a notification to cause the communication session to be rerouted from the prioritized wireless channel to a different wireless channel.

Example 8

A system as described in one or more of examples 1-7, wherein the operations further include: receiving an indication of a session problem in the communication session; forming a notification indicating that the communication session is to be rerouted; and communicating the notification to the network proxy to cause the communication session to be rerouted from the prioritized wireless channel to a different wireless channel.

Example 9

A computer-implemented method for prioritizing a communication session, the method including: ascertaining one or more attributes of a communication session that is initiated between a client device and an endpoint device; determining that the communication session is authenticated with a communication service for a prioritized media path; forming a notification that includes the one or more attributes and an indication that the communication session is authenticated for a prioritized media path; and communicating the notification to a network proxy to cause the communication session to be marked at an Internet Protocol (IP) network with a prioritized class of service indicator and to be routed at a radio access network from a standard wireless channel to a prioritized wireless channel for receipt by the endpoint device.

Example 10

A method as described in example 9, wherein said forming includes: populating an application programming interface (API) with the one or more attributes; and generating the notification using the populated API.

Example 11

A method as described in one or more of examples 9 or 10, wherein said communicating includes communicating the notification while the communication session is in progress.

Example 12

A method as described in one or more of examples 9-11, wherein said communicating includes communicating the notification separately from a media flow of the communication session.

Example 13

A method as described in one or more of examples 9-12, wherein said communicating further causes the communication session to be routed from a standard routing path across the IP network to a prioritized routing path across the IP network.

Example 14

A method as described in one or more of examples 9-13, further including: receiving an indication of a session problem in the communication session; and communicating a notification to the network proxy to cause the communication session to be rerouted from the prioritized wireless channel to a different wireless channel.

Example 15

A method as described in one or more of examples 9-14, further including: receiving an indication of a session problem in the communication session; and communicating the notification to cause the communication session to be rerouted from a current routing path across the IP network to a different routing path across the IP network.

Example 16

A system for prioritizing a communication session, the system including: one or more processors; a communication component configured to receive one or more attributes of a communication session that is initiated between a client device and an endpoint device; and at least one module that is executable by the one or more processors to: determine based on the one or more attributes that the communication session is authenticated with a communication service for a prioritized media path; form a notification that includes the one or more attributes and an indication that the communication session is authenticated for a prioritized media path; and communicate the notification to a network proxy to cause the communication session to be marked at an Internet Protocol (IP) network with a prioritized class of service indicator and to be routed at a radio access network from a standard wireless channel to a prioritized wireless channel for receipt by the endpoint device.

Example 17

A system as described in example 16, wherein the at least one module is configured to communicate the notification separately from a media flow of the communication session.

Example 18

A system as described in one or more of examples 16 or 17, wherein the at least one module is configured to communicate the notification in real-time while the communication session is in progress.

Example 19

A system as described in one or more of examples 16-18, wherein the at least one module is configured to communicate the notification to cause the communication session to be remarked from a current class of service indicator to the prioritized class of service indicator.

Example 20

A system as described in one or more of examples 16-19, wherein the at least one module is configured to communicate the notification to cause the communication session to be routed from a standard routing path across the IP network to a prioritized routing path across the IP network.

CONCLUSION

Techniques for notification for a prioritized media path for a communication session are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
   at least one processor; and
   one or more computer-readable storage media including instructions stored thereon that, responsive to execution by the at least one processor, cause the system to perform operations including:
   ascertaining, by a service implemented on an Internet Protocol (IP) network, one or more attributes of a communication session that is initiated via the IP network between a client device and an endpoint device, the communication session routed from the IP network to a wireless network and initially routed at the wireless network over a default wireless channel of the wireless network to the endpoint device;
   determining that the communication session is authenticated for a prioritized media path;
   forming a notification that includes the one or more attributes and an indication that the communication session is authenticated for a prioritized media path; and
   communicating the notification to a network proxy to cause the communication session to be marked at the IP network with a prioritized class of service indicator and to be rerouted, while the communication session is in progress, from the default wireless channel to a prioritized wireless channel on the wireless network and for receipt by the endpoint device.

2. A system as recited in claim 1, wherein said determining comprises determining that a user of the client device is authenticated for the prioritized media path.

3. A system as recited in claim 1, wherein the system is configured to perform the operations in real-time while the communication session is in progress.

4. A system as recited in claim 1, wherein the system is configured to perform the operations without handling data of the communication session.

5. A system as recited in claim 1, wherein said forming comprises populating an application programming interface (API) with the one or more attributes, and wherein the notification is formatted at least in part with the API.

6. A system as recited in claim 1, wherein said communicating further causes the communication session to be routed from a standard routing path across the IP network to a prioritized routing path across the IP network.

7. A system as recited in claim 1, wherein the operations further include:
   receiving an indication of a session problem in the communication session; and
   communicating a notification to cause the communication session to be rerouted from the prioritized wireless channel to a different wireless channel.

8. A system as recited in claim 1, wherein the operations further include:
  receiving an indication of a session problem in the communication session;
  forming a notification indicating that the communication session is to be rerouted; and
  communicating the notification to the network proxy to cause the communication session to be rerouted from the prioritized wireless channel to a different wireless channel.

9. A computer-implemented method, comprising:
  ascertaining one or more attributes of a communication session initiated via an Internet Protocol (IP) network and initially routed between a client device and an endpoint device over a default wireless channel on a radio access network;
  determining, while the communication session is in progress over the default wireless channel on the radio access network, that the communication session is authenticated with a communication service for a prioritized media path;
  forming a notification that includes the one or more attributes and an indication that the communication session is authenticated for a prioritized media path; and
  communication the notification to a network proxy to cause the communication session to be marked at the IP network with a prioritized class of service indicator and to be rerouted, while the communication session is in progress, at the radio access network from the default wireless channel to a prioritized wireless channel for receipt by the endpoint device.

10. A method as described in claim 9, wherein said forming comprises:
  wherein said forming comprises populating an application programming interface (API) with the one or more attributes; and
  generating the notification using the populated API.

11. A method as described in claim 9, wherein said communicating comprises communicating the notification while the communication session is in progress.

12. A method as described in claim 9, wherein said communicating comprises communicating the notification separately from a media flow of the communication session.

13. A method as described in claim 9, wherein said communicating further causes the communication session to be routed from a standard routing path across the IP network to a prioritized path across the IP network.

14. A method as described in claim 9, further comprising:
  receiving an indication of a session problem in the communication session; and
  communicating a notification to the network proxy to cause the communication session to be rerouted from the prioritized wireless channel to a different wireless channel.

15. A method as described in claim 9, further comprising:
  receiving an indication of a session problem in the communication session; and
  communicating the notification to cause the communication session to be rerouted from a current routing path across the IP network to a different routing path across the IP network.

16. A system comprising:
  one or more processors; and
  at least one module that is executable by the one or more processors to:
  determine based on one or more attributes of a communication session initiated via an Internet Protocol (IP) network and initially routed at a radio access network over a default wireless channel that the communication session is authenticated with a communication service for a prioritized media path;
  form a notification that includes the one or more attributes and an indication that the communication session is authenticated for a prioritized media path;
  communicate the notification to a network proxy to cause a communication policy to be generated that indicates that the communication session is authenticated for a prioritized media path, and to cause the communication session to be marked at the IP network with a prioritized class of service indicator and to be rerouted at the radio access network, while the communication session is in progress, from the default wireless channel to a prioritized wireless channel for receipt by the endpoint device;
  determine that the communication session is terminated; and
  communicate a further notification to the network proxy indicating that the communication session is terminated to cause the communication policy to be cancelled.

17. A system as described in claim 16, wherein the at least one module is configured to communicate the notification separately from a media flow of the communication session.

18. A system as described in claim 16, wherein the at least one module is configured to communicate the notification in real-time while the communication session is in progress.

19. A system as described in claim 16, wherein the at least one module is configured to communicate the notification to cause the communication session to be remarked from a current class of service indicator to the prioritized class of service indicator.

20. A system as described in claim 16, wherein the at least one module is configured to communicate the notification to cause the communication session to be routed from a standard routing path across the IP network to a prioritized routing path across the IP network.

* * * * *